United States Patent
Chang et al.

(10) Patent No.: US 9,600,128 B2
(45) Date of Patent: *Mar. 21, 2017

(54) TOUCH SENSITIVE DEVICE AND TOUCH DETERMINATION METHOD THEREOF

(71) Applicant: eGalax_eMPIA Technology Inc., Taipei (TW)

(72) Inventors: Chin-Fu Chang, Taipei (TW); Shang-Tai Yeh, Taipei (TW)

(73) Assignee: eGalax_eMPIA Technology Inc., Taipei (TW)

( * ) Notice: Subject to any disclaimer, the term of this patent is extended or adjusted under 35 U.S.C. 154(b) by 62 days.

This patent is subject to a terminal disclaimer.

(21) Appl. No.: 14/580,853

(22) Filed: Dec. 23, 2014

(65) Prior Publication Data

US 2015/0185919 A1 Jul. 2, 2015

(30) Foreign Application Priority Data

Dec. 27, 2013 (TW) .............................. 102148795 A

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC .......... G06F 3/045; G06F 3/044; G06F 3/041; H03K 17/9622
USPC ........................... 345/168, 174, 173; 327/517
See application file for complete search history.

(56) References Cited

U.S. PATENT DOCUMENTS

| | | | | |
|---|---|---|---|---|
| 2010/0156795 A1* | 6/2010 | Kim | ......................... | G06F 3/044 345/168 |
| 2012/0081332 A1* | 4/2012 | Atsuta | ..................... | G06F 3/044 345/174 |
| 2013/0093500 A1* | 4/2013 | Bruwer | ................ | H03K 17/955 327/517 |
| 2013/0106774 A1* | 5/2013 | Radivojevic | ............ | G06F 3/044 345/174 |
| 2014/0049494 A1* | 2/2014 | Niu | ........................ | G06F 3/0488 345/173 |
| 2015/0002441 A1* | 1/2015 | Brunet | ................... | G06F 3/0416 345/174 |

* cited by examiner

*Primary Examiner* — Carolyn R Edwards
*Assistant Examiner* — Yuk Chow
(74) *Attorney, Agent, or Firm* — Muncy, Geissler, Olds & Lowe, P.C.

(57) ABSTRACT

The present disclosure relates to a touch control device and touch determination method thereof. When a processor determines a capacitive coupling variation of a sensing point at a sensing panel of the touch sensitive device is smaller than a predetermined negative threshold or larger than a predetermined positive threshold, the processor then computes from local 2D sensing information of second 2D sensing information measured at the sensing point, to obtain a flatness index, The processor determine that the sensing point is not touched by any external object if the flatness index is between a predetermined flatness index negative reference value and a predetermined flatness index positive reference value that indicates the capacitive coupling amount at the sensing point is changed by the sensing point is not touched by any external object, whereby a false touch control determination due to removing water drop on the touch sensing panel can be prevented.

6 Claims, 9 Drawing Sheets

TOUCH SENSITIVE DEVICE AND TOUCH DETERMINATION METHOD THEREOF

This application claims the priority benefit of Taiwan patent application number 102148795, filed on Dec. 27, 2013.

BACKGROUND OF THE INVENTION

1. Field of the Invention

The present disclosure provides a touch sensing device and touch determination method thereof used in the touch sensing device, and more particularly, to prevent the false determination for a touch sensing status of a touch sensing panel caused an external object such as water drop or finger.

2. Description of the Related Art

In order to comply with human intuition, touch sensing devices are widely used in modern electronic products, enabling the user to control electronic products conveniently by means of a touch of a finger or stylus.

Please refer to FIG. 5, when a conventional touch sensing device A1 is started under a mutual capacitive detect mode, the driving and sensing circuit A12 of the touch sensing device A1 measures the capacitive coupling amount (such as the current value, voltage, capacitor or electrical charge amount) at each of all the sensing points A113 between the driving lines A111 and sensing lines A112 of the touch sensing panel A11 at the time no external object (finger or stylus) touches the touch sensing panel A11, and then integrates the measured capacitive coupling amount at each sensing point A113 and the coordinate data of the respective sensing point A113 into a respective 2D sensing information. The processor A13 of the touch sensing device A1 then updates this 2D sensing information to become a reference 2D sensing information and stores this reference 2D sensing information in the memory A14 of the touch sensing device A1.

When an external conductive object touches or covers the touch sensing panel A11 of the touch sensing device A1, the capacitive coupling amount at each sensing point A113 within the touched or covered area is changed. Thus, the processor A13 can read in the reference 2D sensing information from the memory A14, and then subtracts the reference 2D sensing information from each measured 2D sensing information to check the variation of the capacitive coupling amount at each feeling sensing point A113, and to further determine the touch sensing status at each sensing point A113 of the touch sensing panel A11 subject to the variation of the capacitive coupling amount at sensing point.

The processor determines that respective sensing point A113 on the touch sensing panel A11 is not touched by any external electrically conductive object if the capacitive coupling variation of each of all sensing points A113 is between the predetermined positive threshold and the predetermined negative threshold. The processor determines that a sensing point A113 on the touch sensing panel A11 is touched by an external electrically conductive object if the capacitive coupling variation of this sensing point A113 is smaller than the predetermined negative threshold or larger than the predetermined positive threshold.

Please refer to FIG. 6 which is a schematic view of 1D sensing information measured at the area covered by a water drop. The horizontal axis corresponds to the arrangement direction of all sensing points A113 on the driving line A111, the height of respective sensing point A113 on the vertical axis corresponds to different capacitive coupling amount, and the positions of the sensing points A113 and corresponding capacitive coupling amounts are integrated as a waveform of 1D sensing information, and all waveforms of all 1D sensing information on all driving lines A111 are integrated as a 2D sensing information. It is obvious that a negative peak waveform B1 presents on some sensing points A113 covered by the water drop when the touch sensing panel A11 is covered by the water drop. At this time, processor A13 updates the reference 2D sensing information obtained under the covering of the water drop for use as reference 2D sensing information, and a horizontal line waveform B2 will appear on the sensing point A113 within the area covered by the water drop previously when the water drop on the touch sensing panel A11 is removed later and no other external electrically conductive object touch the touch sensing panel A11. Please refer to FIG. 7 which displays a waveform obtained by subtract the horizontal line waveform from the negative peak waveform. The horizontal axis corresponds to the arrangement direction of respective sensing point A113 on the driving line A111, and the vertical axis indicates the variation of capacitive coupling at respective sensing point A113. The processor A13 will determine that the sensing point A113 within the area in which the water drop is removed and no external object touches when the waveform of the 2D sensing information restores to the horizontal line waveform B2 obtained at the time no external object covers the touch sensing panel A11, and a capacitive coupling variation larger than the predetermined positive threshold is measured at the sensing points A113 which is covered by the water drop previously, as shown in FIG. 7, and the processor A13 will execute the touch operation.

Please refer to FIG. 8 and FIG. 9 which display a waveform of 1D sensing information obtained under touch of the finger and a waveform obtained by subtract the horizontal line waveform from a positive peak waveform. When the touch sensing panel A11 is touched by the finger, a positive peak waveform B3 presents at the sensing point A113 within the area touched by the finger. When the processor A13 uses the 2D sensing information obtained under the touch of the finger as the reference 2D sensing information, if the finger leaves the touch sensing panel A11, the waveform of the 2D sensing information restores from the positive peak waveform B3 obtained under the touch of the finger to the horizontal line waveform B2 indicating no covering of the external object, as shown in FIG. 8, and a capacitive coupling variation smaller than the predetermined negative threshold is created at the sensing points A113 within the area touched by the finger previously, so the processor A13 determines the touch sensing panel A11 to be touched and executes the touch operation even if the A113 is not touched by the finger.

Therefore, if the 2D sensing information obtained at the time the water drop covers the touch sensing panel A11 or the finger touches the touch sensing panel A11 is used as the reference 2D sensing information, the capacitive coupling amount of the sensing points A113 being covered by the water drop or the finger will be changed after the abnormal condition on the touch sensing panel A11 is removed, such as removing the water drop or moving the figure apart from the touch sensing panel, the variation of capacitive coupling detected by the processor A13 will be smaller than the predetermined negative determination value or larger than the predetermined positive determination value, and the processor A13 determines that the sensing point A113 is touched by an external object, and make false determination for the touch sensing status of the touch sensing panel A11.

Thus, how to prevent the condition that the touch sensing panel A11 is not touched by any external object but the variation of capacitive coupling is smaller than the predetermined negative threshold or larger than the predetermined positive threshold, is an important subject to study in touch-screen technology.

SUMMARY OF THE INVENTION

The present invention has been accomplished under the circumstances in view. It is therefore the main object of the present disclosure to prevent false touch control determination for a sensing panel of the touch sensitive device caused by the external object such as water drop or finger, and more particularly, when any one of the capacitive coupling variations obtained by subtracting every second time capacitive coupling amount of a second 2D sensing information from respective first time capacitive coupling amount, is larger than predetermined positive threshold or smaller than predetermined negative threshold, the processor then determines whether every flatness index of a flatness index information is ranged between the predetermined flatness index positive reference value and predetermined flatness index negative reference value, to determine the touch sensing status of the touch sensing panel.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
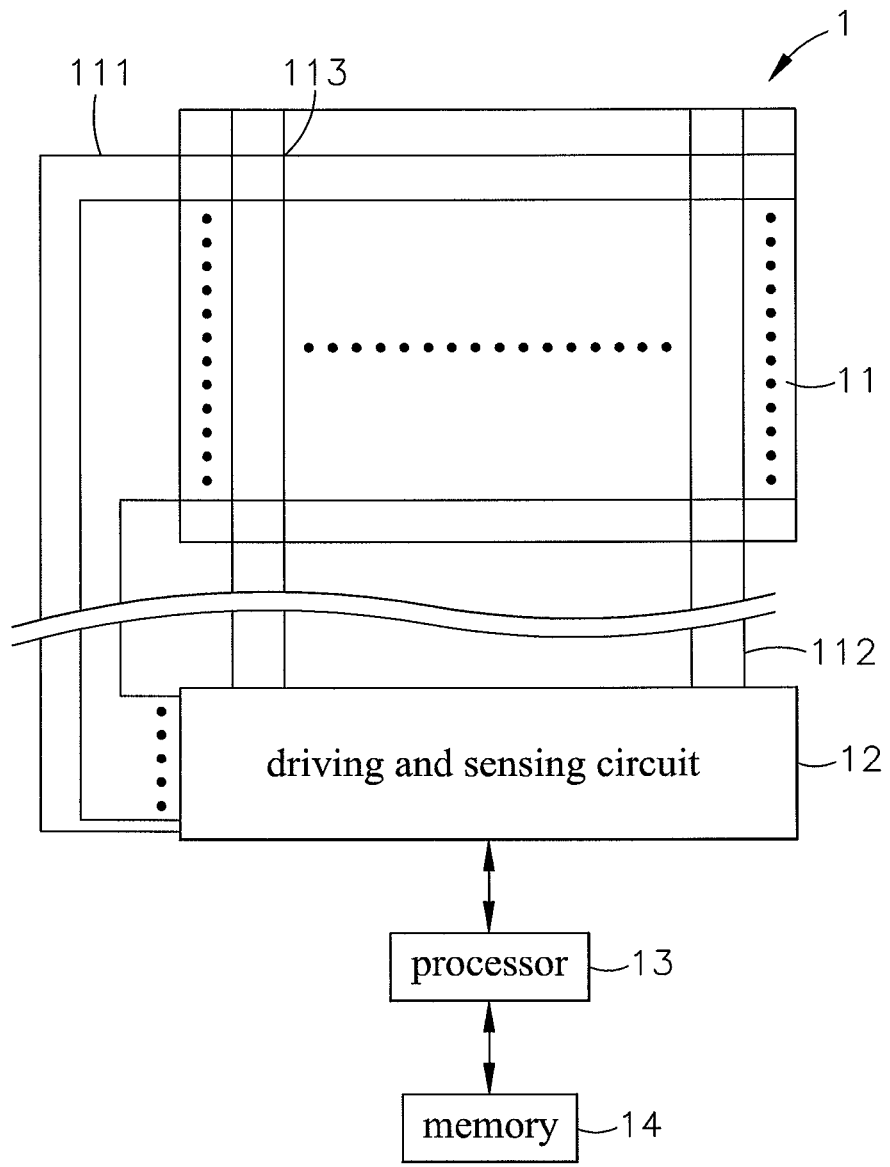
FIG. 1 is a circuit diagram of a preferred embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1, which is a circuit diagram of a preferred embodiment of the present disclosure. A touch determination method of the present invention is used in a mutual capacitance touch sensing device 1. The mutual capacitance touch sensing device 1 includes a touch sensing panel 11 having arranged therein a plurality of driving lines 111 extending along a first axis (a first direction such as direction of horizontal axis) in a parallel manner and a plurality of sensing lines 112 extending along a second axis (a second direction, such as direction of vertical axis) in a parallel manner and crossed over the driving lines 111 cross (or non-orthogonal crossover configuration) to form a plurality of sensing points 113, a driving and sensing circuit 12 electrically connected with the driving lines 111 and sensing lines 112 of the touch sensing panel 11, a processor 13 electrically connected with the driving and sensing circuit 12, and a memory 14 electrically connected to the processor 13.

Figure 2:
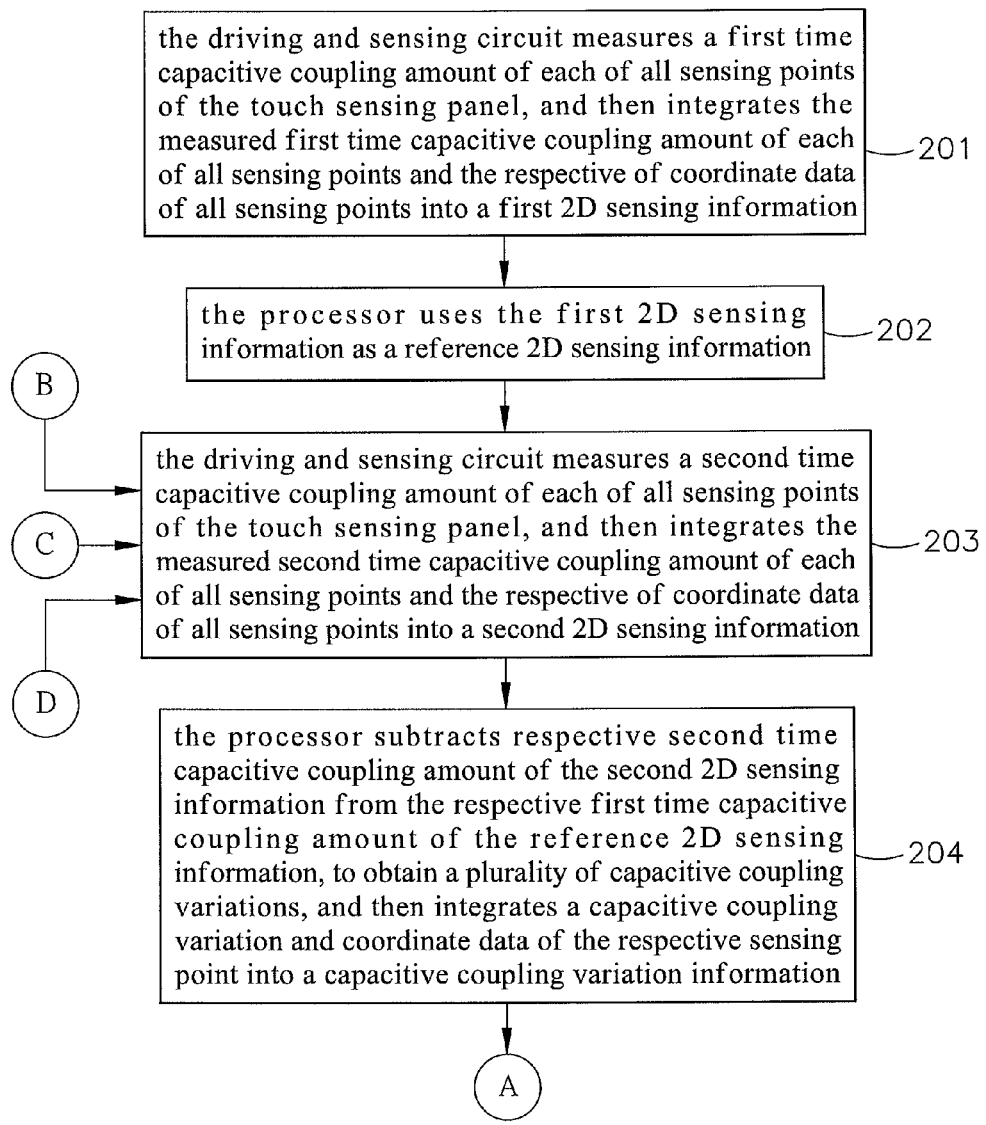
FIG. 2 is a flow diagram (A) of a touch determination method of the present disclosure.
Figure 3:
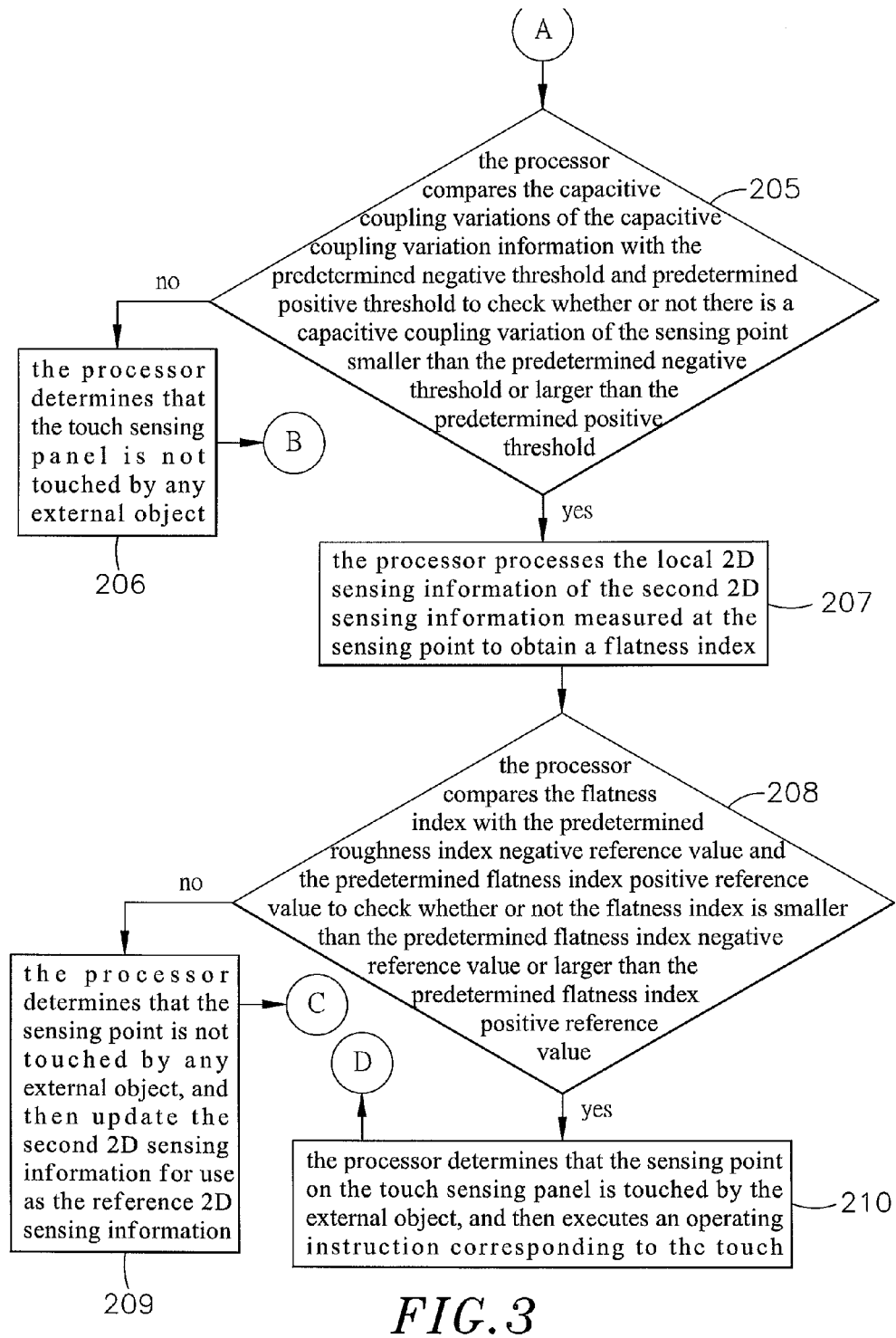
FIG. 3 is a flow diagram (B) of the touch determination method of the present disclosure.

Please refer to FIG. 1 incorporating with FIG. 2 and FIG. 3, which are flow diagram (A) and flow diagram (B) of the touch determination method of the present disclosure. According to FIG. 1, FIG. 2 and FIG. 3, the touch sensing device and touch determination method thereof of the present disclosure includes the following steps.

(201) The driving and sensing circuit 12 measures a first time capacitive coupling amount C of each of all sensing points 113 of the touch sensing panel 11, and then integrates the measured first time capacitive coupling amount C of each of all sensing points 113 and the respective of coordinate data of all sensing points 113 into a first 2D sensing information $C_a$.

(202) The processor 13 uses the first 2D sensing information $C_a$ as a reference 2D sensing information $C_a^0$.

(203) The driving and sensing circuit 12 measures a second time capacitive coupling amount C of each of all sensing points 113 of the touch sensing panel 11, and then integrates the measured second time capacitive coupling amount C of each of all sensing points 113 and the respective of coordinate data of all sensing points 113 into a second 2D sensing information $C_a$.

(204) The processor 13 subtracts respective second time capacitive coupling amount C of the second 2D sensing information $C_a$ from the respective first time capacitive coupling amount C of the reference 2D sensing information $C_a^0$, to obtain a plurality of capacitive coupling variations D, and then integrates a capacitive coupling variation D and coordinate data of the respective sensing point 113 into a capacitive coupling variation information $D_a$.

(205) The processor 13 compares the capacitive coupling variations of the capacitive coupling variation information $D_a$ with the predetermined negative threshold $D_n$ and predetermined positive threshold $D_p$ to check whether or not there is a capacitive coupling variation of the sensing point 113 smaller than the predetermined negative threshold $D_n$ or larger than the predetermined positive threshold $D_p$. And then proceed to step (206) if negative, or step (207) if positive.

(206) The processor 13 determines that the touch sensing panel 11 is not touched by any external object, and return to step (203).

(207) The processor 13 processes the local 2D sensing information $C_p$ of the second 2D sensing information $C_a$ measured at the sensing point 113 to obtain a flatness index S, and proceed to step (208).

(208) The processor 13 compares the flatness index S with the predetermined flatness index negative reference value and the predetermined flatness index positive reference value to check whether or not the flatness index S is smaller than the predetermined flatness index negative reference value $Z_{min}$ or larger than the predetermined flatness index positive reference value $Z_{max}$. And then proceed to step (209) if negative, or step (210) if positive.

(209) The processor 13 determines that the sensing point 113 is not touched by any external object, and then update the second 2D sensing information $C_a$ for use as the reference 2D sensing information $C_a^0$. And then return to step (203).

(210) The processor 13 determines that the sensing point 113 on the touch sensing panel 11 is touched by the external object, and then executes an operating instruction corresponding to the touch. And then return to step (203).

Detailedly, in the aforesaid steps when the touch sensing panel 11 is started, the driving and sensing circuit 12 provides a driving signal to every driving line 111 of the touch sensing panel 11. At this time, each driving line 111 is capacitively coupled with the respective sensing line 112 to generate the respective first time capacitive coupling amount C at the associating sensing point 113 of the touch sensing panel 11. The driving and sensing circuit 12 can get the first time capacitive coupling amount C at each sensing point 113 by directly or indirectly measuring the physical quantity of the capacitance value, current value, voltage value hold or electrical charge amount at the respective sensing point 113. Thereafter, the driving and sensing circuit 12 integrates the measured first time capacitive coupling amount C of each of the sensing points 113 and the coordinate data of each of all sensing points 113 into the first 2D sensing information $C_a$. The processor 13 uses the first 2D sensing information $C_a$ as the reference 2D sensing information $C_a^0$.

When the touch sensing device 1 performs the touch control determination of the touch sensing panel 11 in the follow-up time period, the processor 13 measures the follow-up second time capacitive coupling amount C of every sensing point 113, and integrates the measured second time capacitive coupling amount C of each of the sensing points 113 and the coordinate data of each of all sensing points 113 into the second 2D sensing information Ca, and subtracts the second 2D sensing information $C_a$ from the first time capacitive coupling amount C of the reference 2D sensing information $C_a^0$ obtained at respective sensing point 113 to get the capacitive coupling variation D of every sensing point 113 which is the variation of the capacitive coupling amount C of every sensing point 113 at different time. The processor 13 can integrate the capacitive coupling variation D of each of all sensing points 113 and the coordinate data of each of all sensing points 113 into a capacitive coupling variation information Da, and use the capacitive coupling variation information $D_a$ to perform a first stage of touch control determination for the touch sensing panel 11.

When the processor 13 of the touch sensing device 1 performs the first stage of touch control determination for the touch sensing panel 11 based on the capacitive coupling variation information $D_a$, the processor 13 determines that no sensing point 113 on the touch sensing panel 11 is touched by the external object if capacitive coupling variation D of each of all sensing points 113 is ranged between the predetermined negative threshold $D_n$ and the predetermined positive threshold $D_p$. If the capacitive coupling variation D of the capacitive coupling variation information $D_a$ measured at one of the sensing points 113 is smaller than the predetermined negative threshold $D_n$ or larger than the predetermined positive threshold $D_p$, the processor 13 computes from the local 2D sensing information $C_p$ of the 2D sensing information $C_a$ measured at this sensing point 113 to get the flatness index S for a second stage of the touch control determination for the touch sensing panel 11.

Figure 4:
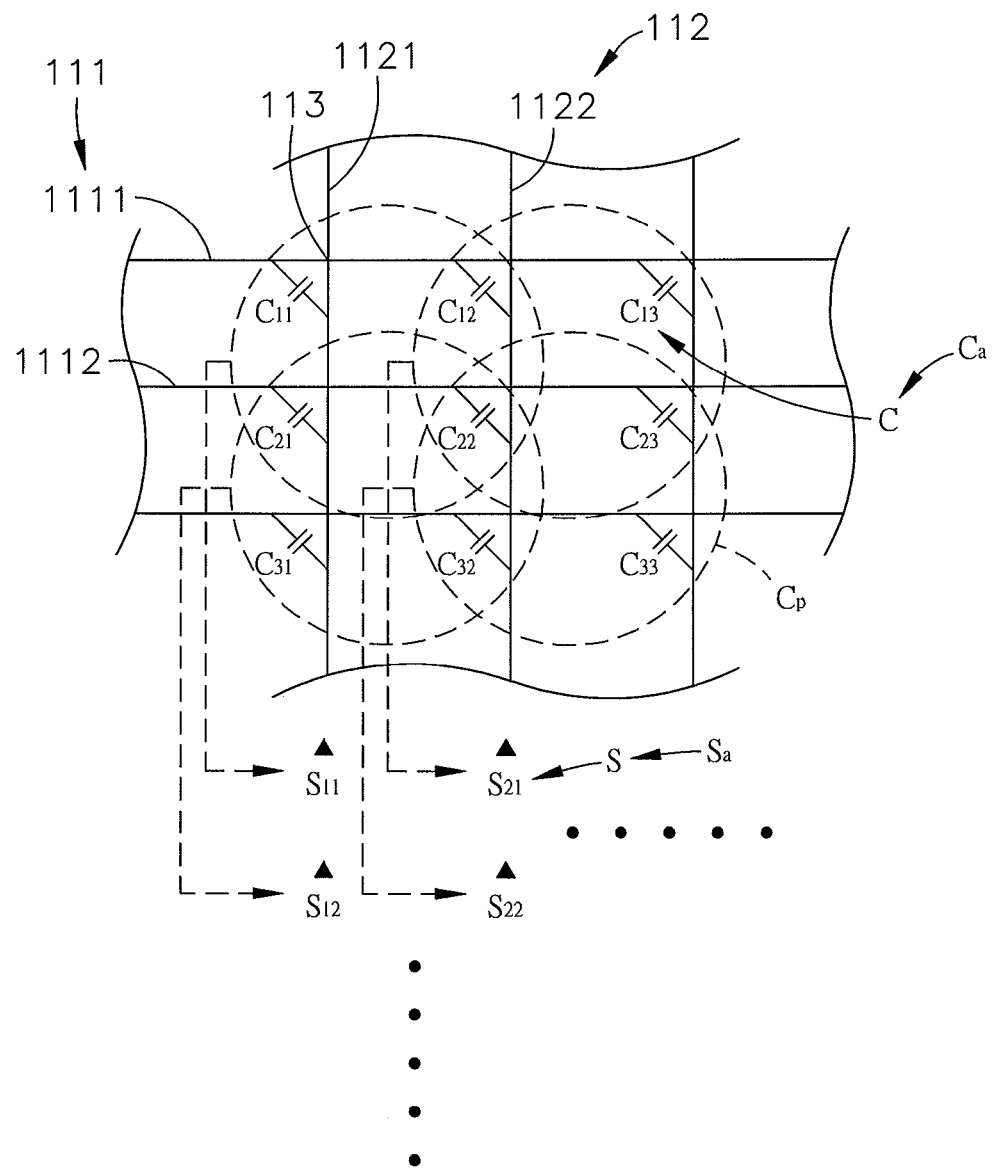
FIG. 4 is a schematic view of a flatness index information of the present disclosure.
Figure 5:
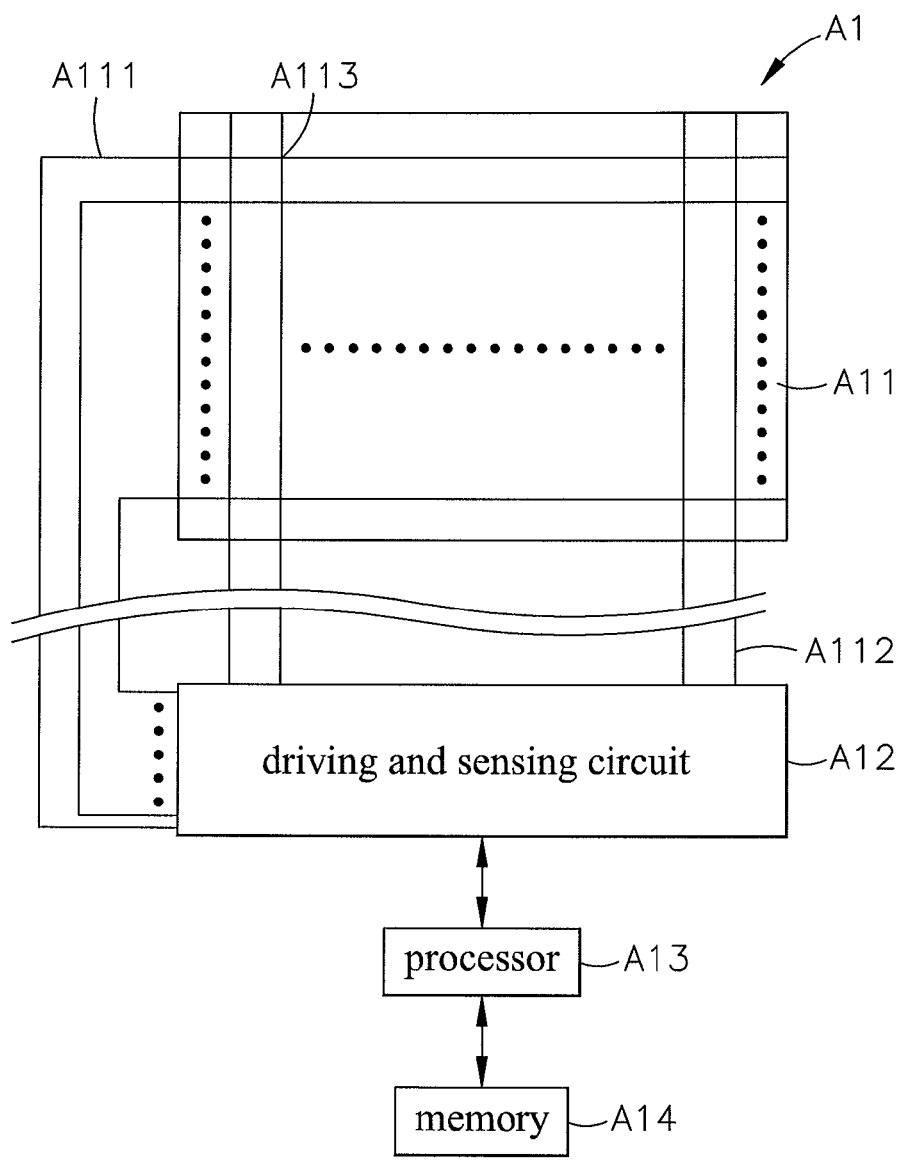
FIG. 5 is a circuit diagram of a touch sensing device.
Figure 6:
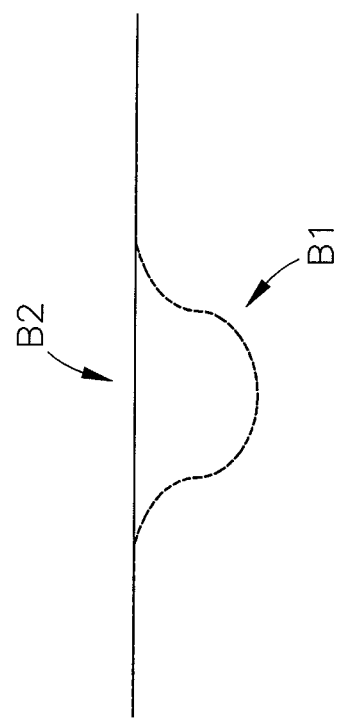
FIG. 6 is a schematic view of a 1D sensing information measured under the covering of water drop.
Figure 7:
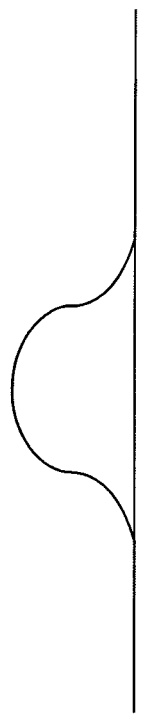
FIG. 7 is a waveform obtained by subtracting the horizontal line waveform from the negative peak waveform.
Figure 8:
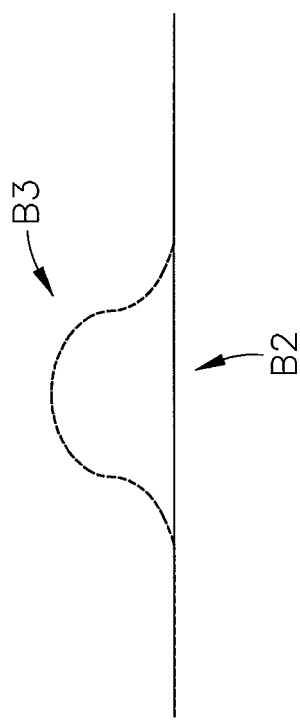
FIG. 8 is a schematic view of 1D sensing information measured under the touch of finger.
Figure 9:
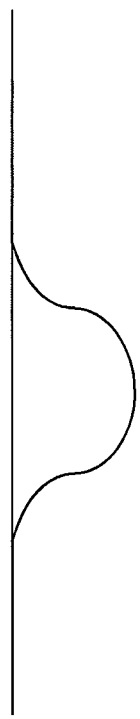
FIG. 9 is a waveform obtained by subtracting the horizontal line waveform from the positive peak waveform.

Please refer to FIG. 4, which is a schematic view of flatness index information of the present disclosure. The processor 13 integrates coordinate data of each predetermined number of adjacent sensing points 113 of all the sensing points 113 between a predetermined number of adjacent driving lines 111 and respective adjacent sensing lines 112 and the respective second time capacitive coupling amounts C of the predetermined number of adjacent sensing points 113, to create the local 2D sensing information $C_p$ corresponding to this sensing point 113. The processor 13 will create a plurality of local 2D sensing information $C_p$ overlaying partially with each other on the touch sensing panel 11, and single sensing point 113 may correspond to one or more local 2D sensing information $C_p$. Further, the processor 13 computes from each local 2D sensing information $C_p$ to get a respective flatness index S by: subtracting the multiple capacitive coupling amounts C at each driving line 111 from one another in the order along the first axis to get respective reminders, and then subtracting the remainders from one another in the order along the second axis. For example, for computation of the flatness index S, the processor 13 can respectively obtain a capacitive coupling amount $C_{11}$ and a capacitive coupling amount $C_{12}$ measured at a first sensing point and a second sensing point arranged along the first axis at the first driving line 1111 via a first sensing line 1121 and a second sensing line 1122; the processor 13 subtracts the capacitive coupling amount $C_{11}$ measured at the first sensing point from the capacitive coupling amount $C_{12}$ measured at the second sensing point, to obtain a first remainder; further, the processor 13 again respectively obtain a capacitive coupling amount $C_{21}$ and a capacitive coupling amount $C_{22}$ measured at a third sensing point and a fourth sensing point arranged along the first axis at the second 1112 via a second sensing line 1121 and a fourthly sensing line 1122; the processor 13 subtracts the capacitive coupling amount $C_{21}$ measured at the third sensing point from the capacitive coupling amount $C_{22}$ measured at the fourth sensing point, to obtain a second remainder; and the processor 13 performs differential computation on the first remainder and the second remainder along a second axis to obtain the flatness index S. Because the second time capacitive coupling amounts C at all the sensing points 113 approximately equal under normal conditions, the flatness index S obtained by subtracting the capacitive coupling amounts C is approximately equal to zero, i.e., the flatness index S will be in the range between the predetermined flatness index negative reference value $Z_{min}$ and the predetermined flatness index positive reference value $Z_{max}$. The predetermined flatness index negative reference value $Z_{min}$ and the predetermined flatness index positive reference value $Z_{max}$ are built in the processor 13 for enabling the processor 13 to perform the second stage of the touch control determination for the touch sensing panel 11 based on the flatness index S. With respect to the computation of variation the flatness index S, please refer to the present inventor's another patent application entitled "Mutual capacitance touch sensing device and method for inspecting same", filed on the same date. Therefore, the detailed description is omitted.

When the processor 13 of the touch sensing device 1 uses the flatness index information $S_a$ for the second stage of touch control determination for the touch sensing panel 11, the processor 13 determines that every sensing point 113 of the touch sensing panel 11 is not touched by any external object if all flatness indexes S are ranged between the predetermined flatness index positive reference value $Z_{max}$ and the predetermined flatness index negative reference value $Z_{min}$, and further updates the 2D sensing information $C_a$ for use as reference 2D sensing information $C_a^0$ for matching with the follow-up 2D sensing information $C_a$ and for further determining the touch sensing status of every sensing point 113 on the touch sensing panel 11. The processor 13 determines that the sensing point 113 is touched if the flatness index S is larger than the predetermined flatness index positive reference value $Z_{max}$ or smaller than the predetermined flatness index negative reference value $Z_{min}$, and the processor 13 executes the touch operation.

In touch sensing device and the touch determination method thereof of the present disclosure, when the capacitive coupling variation D measured at one of the sensing points 113 is smaller than the predetermined negative threshold $D_n$ or larger than the predetermined positive threshold $D_p$, the processor 13 computes from the local second 2D sensing information $C_p$ of the 2D sensing information $C_a$ measured at this sensing point 113 to get the flatness index S, and use the flatness index S to determine the touch control determination for the touch sensing panel 11. The processor 13 uses the first 2D sensing information $C_a$ measured at the area covered by the water drop as the reference 2D sensing information $C_a^0$, if the water drop on the touch sensing panel 11 is removed and no external object touches the touch sensing panel 11 in the follow-up time period, because the flatness index S is ranged between the predetermined flatness index negative reference value $Z_{min}$ and the predetermined flatness index positive reference value $Z_{max}$, the processor 13 determines that this sensing point 113 is not touched even if the capacitive coupling amount C measured at the sensing point 113 previously covered or touched by the external object is changed, so as to prevent the false touch control determination.

If the processor 13 uses the first 2D sensing information Ca measured at the area touched by the finger as the reference 2D sensing information $C_a^0$ and the finger leaves the touch sensing panel 11 in the follow-up time period, because the flatness index S obtained under no external object touch is ranged between the predetermined flatness index negative reference value $Z_{min}$ and the predetermined flatness index positive reference value $Z_{max}$, the processor 13 determines that this sensing point 113 is not touched by external object even if the capacitive coupling amount C measured at the sensing point 113 previously touched is changed.

Further, the processor 13 can store the reference 2D sensing information $C_a^0$ in the memory 14, and read in the storage reference 2D sensing information $C_a^0$ from the memory 14 for matching with the follow-up measured 2D sensing information Ca for determining the touch sensing status of each sensing point 113 of the touch sensing panel 11.

In conclusion, the invention provides a touch sensing device and a touch determination method thereof, and the above description is just the preferred embodiment of the present disclosure, but the present disclosure is not limited thereto. When the abnormal condition (such as being covered by the water drop or touched by the finger) presents on the touch sensing panel 11, the method enables the processor 13 of the touch sensing device 1 to measure the first 2D sensing information $C_a$ and use the first 2D sensing information $C_a$ as the reference 2D sensing information $C_a^0$. When the abnormality is cleared and no external object touch the touch sensing panel 11 in the follow-up time period, the processor 13 can use the flatness index S corresponding to every sensing point 113 which is ranged between predetermined flatness index positive reference value $Z_{max}$ and predetermined flatness index negative reference value $Z_{min}$ under no touch of the external object, to determine that the touch sensing panel 11 is not touched by the external object, so as to prevent the false touch control determination for the touch sensing panel 11.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A touch determination method, used in a touch sensing device comprising a touch sensing panel which has arranged therein a plurality of driving lines and a plurality of sensing lines crossed over the driving lines to form a plurality of sensing points, a driving and sensing circuit electrically connected with the driving lines and the sensing lines, a processor electrically connected with the driving and sensing circuit, and a memory electrically connected to the processor, and the touch determination method comprising the steps of:
   (A01) the driving and sensing circuit measuring a first time capacitive coupling amount at each of the sensing points on each of the driving lines via each of the sensing lines, and then integrating the measured first time capacitive coupling amount of each of the sensing points and respective coordinate data of all the sensing points into a first 2D sensing information;
   (A02) the processor using the first 2D sensing information as a reference 2D sensing information;
   (A03) the driving and sensing circuit again measuring a second time capacitive coupling amount at each of the sensing points on each of the driving lines via each of the sensing lines, and then integrating the measured second time capacitive coupling amount of each of the sensing points and respective coordinate data of all the sensing points into a second 2D sensing information;
   (A04) the processor subtracting the respective second time capacitive coupling amount of the second 2D sensing information from the respective first time capacitive coupling amount of the reference 2D sensing information, to obtain a plurality of capacitive coupling variations, and then integrating each of the capacitive coupling variations and respective coordinate data of all the sensing points into a capacitive coupling variation information;

(A05) the processor comparing the capacitive coupling variations of the capacitive coupling variation information with a predetermined negative threshold and a predetermined positive threshold to check whether or not there is the capacitive coupling variation of the sensing point smaller than the predetermined negative threshold or larger than the predetermined positive threshold, and then proceeding to step (A06) if negative, or step (A07) if positive;

(A06) the processor determining that the touch sensing panel is not touched by an external object, and returning to step (A03);

(A07) the processor processing the local 2D sensing information of the second 2D sensing information measured at the sensing point to obtain a flatness index, and proceeding to step (A08);

(A08) the processor comparing the flatness index with the predetermined flatness index negative reference value and the predetermined flatness index positive reference value to check whether or not the flatness index is smaller than the predetermined flatness index negative reference value or larger than the predetermined flatness index positive reference value, and then proceeding to step (A09) if negative, or step (A10) if positive;

(A09) the processor determining that the sensing point is not touched by the external object, and then updating the second 2D sensing information for use as the reference 2D sensing information, and returning to step (A03); and (A10) the processor determining that the sensing point on the touch sensing panel is touched by the external object, and then executing an operating instruction correspondingly, and returning to step (A03).

2. A touch determination method, used in a touch sensing device comprising a plurality of driving lines and a plurality of sensing lines which form a plurality of sensing points to measure capacitive coupling amounts, a driving and sensing circuit electrically connected with the driving lines and the sensing lines, and a processor electrically connected with the driving and sensing circuit, and the touch determination method comprising the steps of:

enabling the processor to control the driving and sensing circuit in measuring a first time capacitive coupling amount and a second time capacitive coupling amount of each of all the sensing points at different time;

enabling the processor to subtract the second time capacitive coupling amount of each of all the sensing points from the respective first time capacitive coupling amount, to obtain a capacitive coupling variation of each of all the sensing points;

enabling the processor to determine whether the capacitive coupling variation of any one of the sensing points is smaller than the predetermined negative threshold or larger than the predetermined positive threshold;

enabling the processor to compute from the second time capacitive coupling amount measures at the sensing points between a predetermined number of adjacent the driving lines and respective adjacent the sensing lines to obtain a flatness index when the capacitive coupling variation of one of the sensing points is smaller than the predetermined negative threshold or larger than the predetermined positive threshold; and enabling the processor to determine whether the flatness index is smaller than the predetermined flatness index negative reference value or larger than the predetermined flatness index positive reference value, and determine that the sensing point of the touch sensing panel is touched by external electrically conductive object if the flatness index is smaller than the predetermined flatness index negative reference value or larger than the predetermined flatness index positive reference value.

3. The touch determination method according to claim 2, wherein the step of enabling the processor to compute from the second time capacitive coupling amount measured at the sensing points to obtain the flatness index, comprises steps of:

enabling the processor to respectively obtain a capacitive coupling amount measured at a first sensing point and a capacitive coupling amount measured a second sensing point arranged along a first axis at a first driving line via a first sensing line and a second sensing line;

enabling the processor to subtracts the capacitive coupling amount measured at the first sensing point from the capacitive coupling amount measured at the second sensing point, to obtain a first remainder;

enabling the processor to respectively obtain a capacitive coupling amount measured at a third sensing point and a capacitive coupling amount measured at a fourth sensing point arranged along the first axis at the second driving line via the third sensing line and the sensing line;

enabling the processor to subtract the capacitive coupling amount measured at the third sensing point from the capacitive coupling amount measured at the fourth sensing point, to obtain a second remainder; and enabling the processor to perform differential computation on the first remainder and the second remainder along a second axis to obtain the flatness index.

4. A touch sensing device, comprising:

a touch sensing panel, having a plurality of driving lines arranged along a first axis and a plurality of sensing lines arranged along a second axis and crossed over the driving lines;

a driving and sensing circuit, connected electrically with each of the driving lines and each of the sensing lines, and adapted for measuring a first 2D sensing information and a second 2D sensing information;

a processor, connected electrically with the driving and sensing circuit, and adapted for calculating a capacitive coupling variation information and a plurality of flatness indexes, to determine a touch sensing status of the touch sensing panel.

5. A touch sensing device, comprising:

a plurality of driving lines and a plurality of sensing lines, forming a plurality of sensing points to measure capacitive coupling amounts;

a driving and sensing circuit, connected electrically with each of the driving lines and each of the sensing lines;

a processor, connected electrically with the driving and sensing circuit, and adapted for controlling the driving and sensing circuit in measuring a first time capacitive coupling amount and a second time capacitive coupling amount of each of all the sensing points at different time, and subtracting the second time capacitive coupling amount of each of all the sensing points from respective first time capacitive coupling amount to obtain a capacitive coupling variation of each of all the sensing points, and determining whether the capacitive coupling variation of any one of the sensing points is smaller than the predetermined negative threshold or larger than the predetermined positive threshold, and the processor computing from the second time capacitive coupling amount measures at the sensing points between a predetermined number of adjacent the driving lines and respective adjacent the sensing lines to obtain a flatness index when the capacitive coupling variation of one of the sensing points is smaller than the predetermined negative threshold or larger than the predetermined positive threshold; and the processor determining whether the flatness index is smaller than the predetermined flatness index negative reference value or larger than the predetermined flatness index positive reference value, and determining that the sensing point of the touch sensing panel is touched by external electrically conductive object if the flatness index is smaller than the predetermined flatness index negative reference value or larger than the predetermined flatness index positive reference value.

6. The touch sensing device according to claim 5, wherein the processor respectively obtains a capacitive coupling amount measured at a first sensing point and a capacitive coupling amount measured at a second sensing point arranged along the first axis at the first driving line via a first sensing line and a second sensing line, and then subtracts the capacitive coupling amount measured at the first sensing point from the capacitive coupling amount measured at the second sensing point, to obtain a first remainder, and the processor respectively obtains a capacitive coupling amount measured at a third sensing point and a capacitive coupling amount measured at a fourth sensing point arranged along the first axis at the second driving line via the first sensing line and the second sensing line, and then subtracts the capacitive coupling amount measured at the third sensing point from the capacitive coupling amount measured at the fourth sensing point, to obtain a second remainder, and performs differential computation on the first remainder and the second remainder along a second axis to obtain the flatness index.

* * * * *